(12) United States Patent
Dwivedi et al.

(10) Patent No.: US 9,069,936 B2
(45) Date of Patent: *Jun. 30, 2015

(54) LICENSING VERIFICATION FOR APPLICATION USE

(71) Applicant: Microsoft Corporation, Redmond, WA (US)

(72) Inventors: Sanjeev Dwivedi, Sammamish, WA (US); Sunil Kadam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,903

(22) Filed: Jul. 12, 2014

(65) Prior Publication Data

US 2014/0325683 A1 Oct. 30, 2014

Related U.S. Application Data

(63) Continuation of application No. 13/192,455, filed on Jul. 27, 2011, now Pat. No. 8,800,058.

(51) Int. Cl.
*G06F 7/04* (2006.01)
*G06F 21/10* (2013.01)

(52) U.S. Cl.
CPC .............. *G06F 21/10* (2013.01); *G06F 21/105* (2013.01)

(58) Field of Classification Search
CPC ................................ G06F 21/105; G06F 21/10
See application file for complete search history.

(56) References Cited

U.S. PATENT DOCUMENTS

| 6,824,051 | B2* | 11/2004 | Reddy et al. .................. 235/380 |
| 7,703,142 | B1* | 4/2010 | Wilson et al. ................... 726/26 |
| 2002/0107809 | A1* | 8/2002 | Biddle et al. .................... 705/59 |
| 2005/0039043 | A1* | 2/2005 | De Boursetty et al. ....... 713/200 |
| 2005/0289072 | A1* | 12/2005 | Sabharwal ....................... 705/59 |
| 2007/0100768 | A1* | 5/2007 | Boccon-Gibod et al. ....... 705/59 |
| 2009/0013177 | A1* | 1/2009 | Lee et al. ....................... 713/158 |
| 2010/0275026 | A1* | 10/2010 | McLean ........................ 713/176 |
| 2011/0177792 | A1* | 7/2011 | Bruno et al. .................. 455/411 |
| 2012/0079578 | A1* | 3/2012 | Dachiraju et al. ................ 726/7 |
| 2012/0246704 | A1* | 9/2012 | Dorsey et al. ..................... 726/4 |

* cited by examiner

*Primary Examiner* — Matthew Henning
(74) *Attorney, Agent, or Firm* — Aneesh Mehta; Kate Drakos; Micky Minhas

(57) ABSTRACT

Techniques involving detection of misuse of digital licenses pertaining to application use. An identification of unsigned applications or other use-protected applications enabled for use at a user device is obtained. The identification of such applications is directed to a licensing authority to seek digital license renewal for using the applications. A renewed digital license is received if the provided identification of use-protected applications corresponds to what is authorized by the licensing authority for use at the user device. In other embodiments, verification information may be provided to protect the identification of unsigned applications from tampering, such as information indicative of whether the identification of unsigned applications originated at the user device in which the use-protected applications are used, and indicative of whether the identification of the unsigned applications is a copy of a previous identification of the unsigned applications.

20 Claims, 8 Drawing Sheets

LICENSING VERIFICATION FOR APPLICATION USE

RELATED APPLICATIONS

This application is a Continuation of application Ser. No. 13/192,455, filed Jul. 27, 2011 (pending and allowed), which is incorporated herein by reference in its originally filed form.

BACKGROUND

Digital computing devices such as computers, smart phones and other mobile/hand-held devices, and other processing devices are typically capable of allowing installation and execution of new programs. While programs can be purchased in physical packages and installed by way of hardware media interfaces such as drives, the speed and reliability of today's wireline and wireless networking infrastructures has made possible the real-time identification and retrieval of applications/programs electronically. These applications or other programs (hereinafter referred to generally as applications) may be obtained via a digital application distribution platform or other network-accessible site that serve as a "store" for such applications and other digital content.

The relative ease at which applications may be added to the digital storefront, and ultimately provided to requesting users, has ignited a colossal upsurge in application development. Some developers may provide applications at no cost to further interests of a business or other purpose, while other applications may be made available for purchase. The chance of securing a financial return or serving alternative goals furthers the activity in the application development arena. As a result, manners of facilitating application developers in their development efforts may become increasingly important.

Developers of applications may use an application development platform to assist in the development, debugging and other testing of the developed applications. Users in other categories than development may also have particular needs working with or using applications in manners that are out of the norm. As a result, different licenses may confer different privileges for different categories of use, such as a use license for a typical application user, a developer license for a developer, etc. For example, a developer license may include additional use privileges over what a typical use license would confer. These additional privileges may, in some cases, present new security holes that can adversely affect application distribution centers, and the developers, authors and owners of distributed applications.

SUMMARY

Techniques involving detection of misuse of digital licenses pertaining to application use. Representative techniques facilitate verification of license compliance for executing applications such as, for example, applications that are use-protected by digital signatures or other means.

In one embodiment, a computer-implemented method is provided for facilitating digital license renewal. An identification of use-protected applications enabled for use at a user device is obtained, and directed to a licensing authority with a license renewal request. A renewed digital license is received if the provided identification of use-protected applications corresponds to what is authorized by the licensing authority for use at the user device.

In a particular embodiment of such a computer-implemented method, the method may further include providing verification information indicative of whether the identification of use-protected applications originated at the user device in which the use-protected applications are used, and indicative of whether the identification of the use-protected applications is a copy of a previous identification of the use-protected applications. In one embodiment, a renewed license is received if the identification of use-protected applications originated at the user device, and the identification of use-protected applications is not a copy of a previous identification of the use-protected applications.

According to another embodiment, a computer-readable medium having instructions stored thereon which are executable by a computer system is provided. The instructions provide functions including collecting information such as an identification of the unsigned applications used on a client device, a timestamp associated with the delivery of the unsigned applications; and a machine identifier uniquely identifying the client device on which the unsigned applications are used. The information may be encrypted with a key available at the client device. A hardware identifier that has been derived from a plurality of components of the client device is obtained, and is associated with the encrypted information to construct a data package. The data package is transmitted in order that a determination be made of whether any of the unsigned applications at the client device is unauthorized based on at least the timestamp relative to a prior timestamp, and the hardware identifier relative to a prior hardware identifier for the client device.

In accordance with yet another embodiment, a computer-implemented method is provided for renewing an application license. An application license may be transmitted, such as via a transmitter, to provide permission for a user device to execute licensable applications, for a limited period of time, that would otherwise be unauthorized for use on the user device without the application license. In connection with expiration of the application license, a record of unsigned applications on the user device that have not been digitally signed is received. The record of unsigned applications on the user device is compared to a stored record of unsigned applications that the application license permitted the user device to execute. If the record of unsigned applications on the user device corresponds to the stored record of unsigned applications that the user device has been permitted to execute, the application license is renewed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
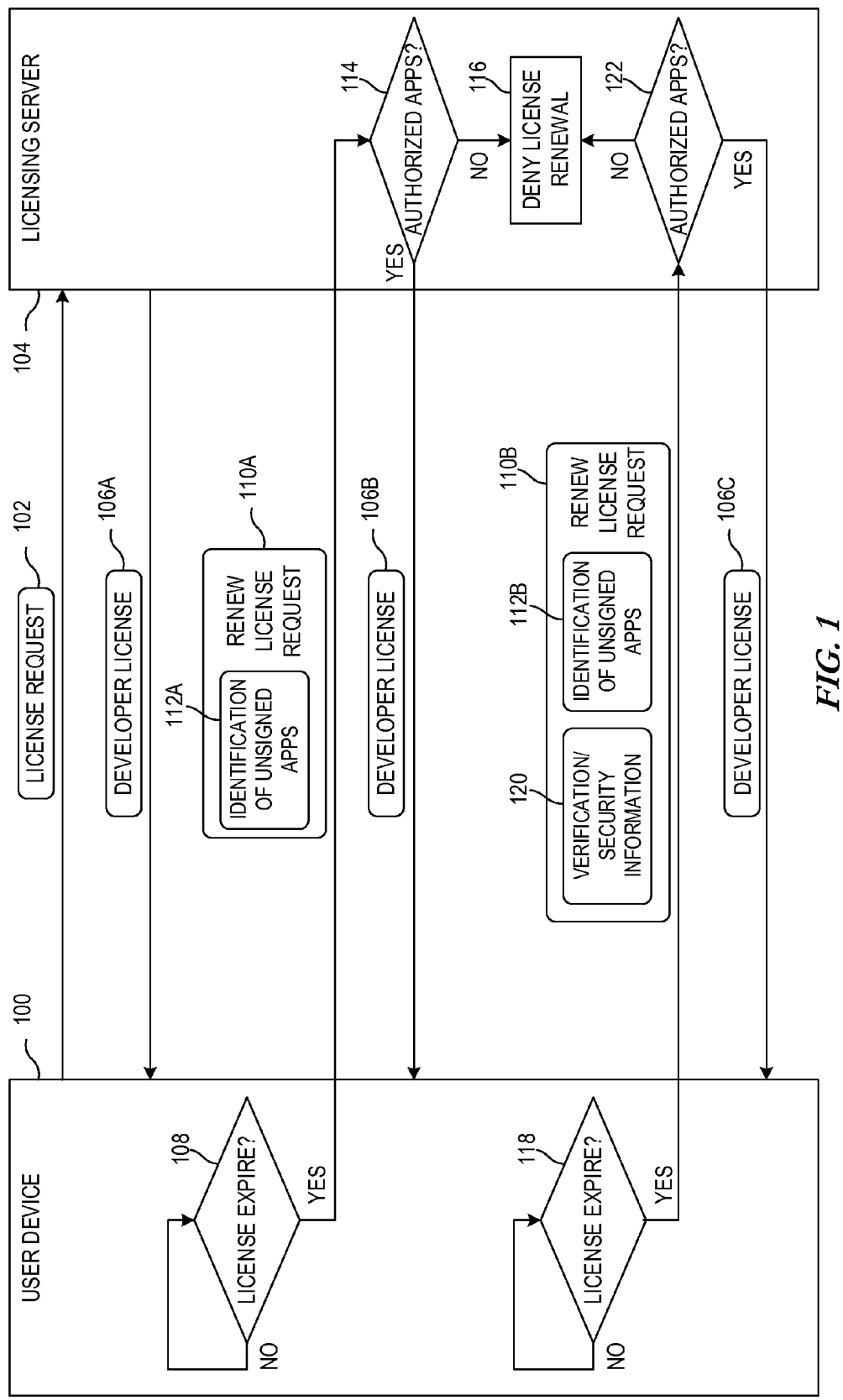
FIG. 1 is a block diagram illustrating a representative user device and licensing server collaboration for verifying digital license compliance for possible renewal of the digital license.

In the following description, reference is made to the accompanying drawings that depict representative implementation examples. It is to be understood that other embodiments and implementations may be utilized, as structural and/or operational changes may be made without departing from the scope of the disclosure.

The disclosure is generally directed to digital licensing verification and enforcement. In a particular implementation, techniques are disclosed for verifying compliance with licensing rules for running use-protected applications while having application development mode access to such use-protected applications. The failure of application developers and other users to comply with licensing rules can lead to the unauthorized use of other applications by the developer/user.

Applications and other programs can be executed on any device that includes an operating system capable of executing such applications, ranging from devices having embedded processors, to mobile devices, to desktop devices, to mainframe computing systems, etc. The proliferation of applications available to users via networks is a result of many factors, including the relative ease in which application developers can add their developed applications to a digital application distribution platform, and distribute their applications for financial or other returns. Users of applications typically receive a license to use applications when they are purchased or otherwise downloaded. Similarly, application developers may obtain a developer license when, for example, the developer registers as a developer on the application distribution platform. Among other things, the developer license may allow the developer to test the developed application on one or more devices. An application developer can therefore obtain a developer license to test or otherwise run developed applications on each of the devices to which the application is being developed for use. As an example, a developer license can allow the developer to run unsigned code, which is application code that does not have a digital certification. The privileges associated with a developer license may be, however, subject to illicit extension to non-development situations.

For example, developers or other users running unsigned applications with a developer license could possibly be run later when no longer in development mode. Further, having a developer license may give the holder of the developer license the freedom of running any unsigned code. With a developer license, an application could be taken from the application distribution platform, its certification signature removed, and the application executed. This in essence enables a developer or other use who has a first type of license (e.g. developer license) to illicitly extend it to bypass using a second type of license (e.g. user license to use an application). In more vernacular parlance, a user having a developer license could "pirate" an application that is not the developer's application, by using the privileges associated with the developer license to remove its certification signature and use it without acquiring a user license. In accordance with embodiments described herein, efforts to bypass obtaining legitimate user licenses can be detected, and corrective action may be taken.

As noted above, a developer mode in an application distribution platform's development process may allow a user to unlock a device and run unsigned applications where only signed applications might otherwise be allowed to run. The present disclosure describes techniques in which such security holes may be addressed.

For example, referring to FIG. 1, the user device 100 represents any computing device of a user seeking a developer license. In this example, the user device 100 issues a license request 102 to a licensing server 104 that assists in the determination of whether a developer license is to be granted. The licensing server 104 issues a developer license 106A to enable the user device 100 to presumably run, debug, or otherwise work with one or more applications in development. One manner of addressing the security issues described above involves making the developer license 106A expire after some period of time or in connection with some event. In one embodiment, when the license has expired as determined at block 108, a license renewal request 110A is issued from the user device 100 to the licensing server 104. In this embodiment, to renew the developer license, an identification 112A of installed, unsigned applications is included with the license renewal request 110A or in one or more separate messages. The identification may be provided in any manner that identifies the applications, such as a list of application names, their hash values, assigned identifier values, etc. This list or other identification 112A of applications can be used by the licensing server 104 to determine whether or not an extension to the developer license should be granted, as depicted at block 114. If any of the unsigned applications associated with the identification 112A have not been authorized for use by the user device 100, then the license renewal may be denied as depicted at block 116. Otherwise, the developer license 106B is renewed and provided to the user device 100.

While the embodiment above work in many situations, a problem with this approach is that some users may attempt to trick the developer platform into believing that there are no unauthorized unsigned applications. For example, a user could send an empty or otherwise innocuous list of applications to the server 104 when the user's device 100 actually has one or more unsigned applications that it should not have. The user could do this, for example, by sending a copy of the same list (or other identification) of unsigned applications that was previously sent to the licensing server 104 when no unlicensed unsigned applications were present. More particularly, the user could attempt to resend the same unsigned application identification 112A from the same user device 100 at a later point in time to try to trick the licensing server 104 into issuing a renewed developer license 106B. In another example, the user could attempt to resend the same unsigned application identification 112A from a different user device than the user device 100 where the unauthorized unsigned applications are being used. In these or other manners, the user device 100 could continue to use unlicensed, unsigned applications since transmitting the last list or other identification 112A of unsigned applications.

To address these representative situations and other similar situations, one embodiment involves techniques to securely send a list of unsigned applications from the relevant user device 100 to the licensing server 104. In the example of FIG. 1, when it is determined at block 118 that the developer license 106A has expired, a license renewal request 1106 is issued from the user device 100 to the licensing server 104.

An identification 112B of unsigned applications available at the user device 100 is provided with the license renewal request 110B, although additional techniques are used to address potential problems associated with a user's delivery of an illegitimate list or other identification 112B of unsigned applications. For example, verification/security information 120 may be provided to provide legitimacy to the identification 112B of unsigned applications. As is described below, the verification/security information 120 may include any information used for verification and/or security such as, for example, one or more identifiers to identify the user device 100, time information to indicate when information is acquired, encryption or other security measures, etc. It is determined at block 122 whether the license renewal request 110B includes a legitimate list or other identification 112B of unsigned applications. If not, license renewal may be denied as shown at block 116; else a developer license 106C may be provided to the user device 100.

Figure 2:
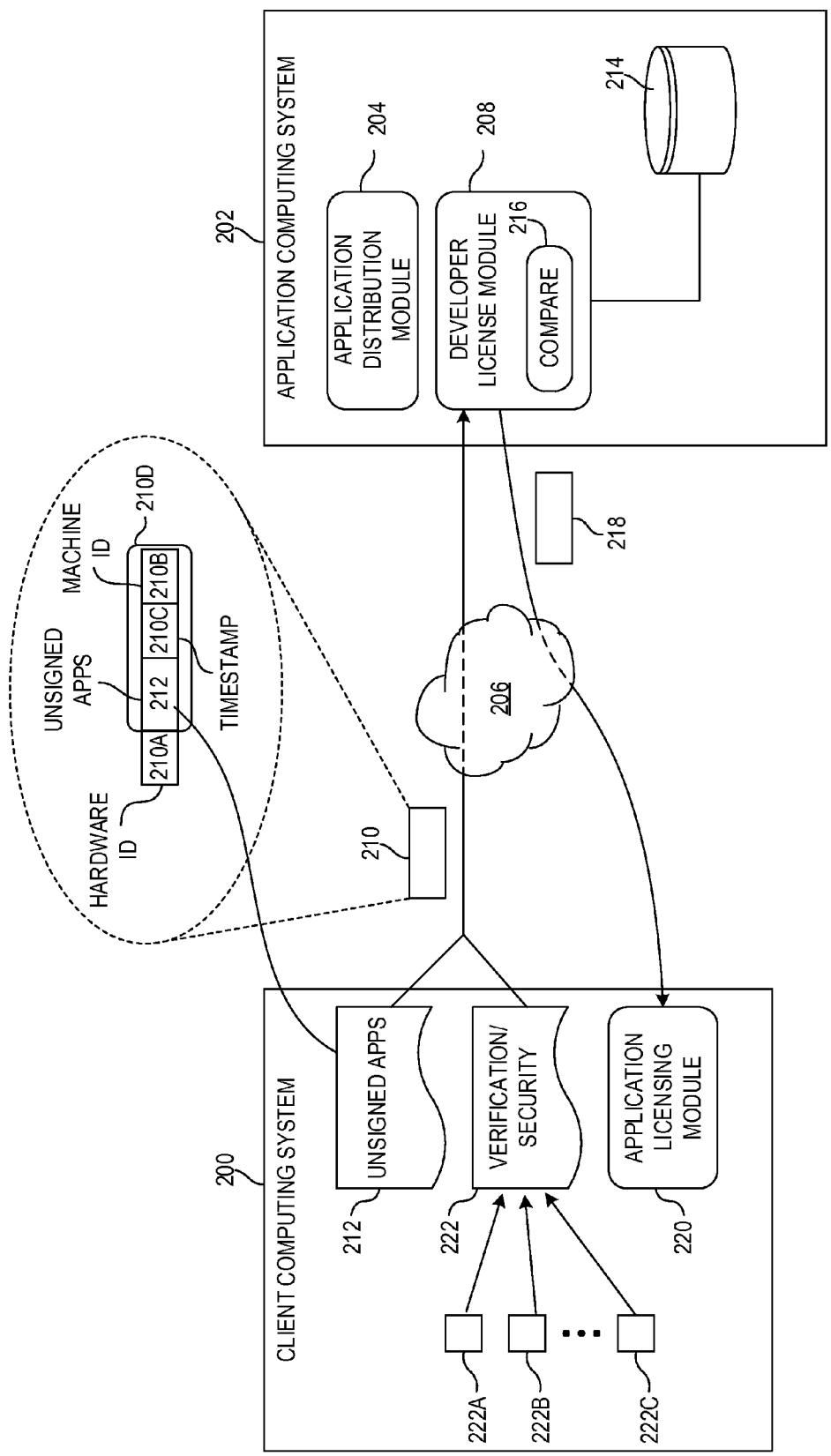
FIG. 2 is a block diagram illustrating another representative technique for verifying license parameters for a category of licenses such as for developer licenses.

FIG. 2 is a block diagram illustrating another representative technique for verifying license parameters for a category of licenses, such as for developer licenses. In this example, the user device is represented by client computing system 200, which represents any apparatus capable of processing information to provide the desired information, and capable of communicating with an application computing system 202 to at least communicate requests for renewal of licenses of the particular category. While the principles described herein are capable of being applied to any particular category of licenses, the examples described herein are primarily described in terms of developer licenses that enable a user of the developer license to run unsigned applications.

In the example of FIG. 2, the application computing system 202 includes an application distribution module 204. The application distribution module 204 may be implemented at least in part via software executable via one or more processors (not shown). The application distribution module 204 represents the entity or module that provides applications to client devices. In one embodiment, the application distribution module 204 essentially provides a storefront for digital applications and/or other content that may be requested by the client computing system 200 via networks 206.

As noted above, a user of the client computing system 200 may obtain one or more licenses that have special or otherwise different privileges than other licenses. For example, a developer license may be accompanied by the privilege of being able to run unsigned applications that a user license may not provide. The example of FIG. 2 assumes that the client computing system 200 has received a developer license by way of the developer license module 208. As noted above, such a license may be set to expire occasionally, repeatedly, periodically, etc. When the client computing system 200 is to renew its developer license as a result of the current license having expired or being set to expire, a developer license renewal request 210 may be issued by the client computing system 200.

In accordance with one embodiment, the client computing system 200 is configured to collect identifications of the unsigned applications 212 to provide to the developer license module 208. In this manner, the developer license module 208 can determine from the list or other identification of unsigned applications 212 whether the client computing system 200 has applications that do not have a certification signature, and that are not authorized to be used on the client computing system 200. Unsigned applications 212 that are not authorized for use on the client computing system 200 may include those applications that are not part of the development that gave rise to the user receiving the developer license in the first place. The developer licensing module 208 may access stored information for each user and/or client computing system (e.g. client computing system 200). For example, the unsigned applications authorized for use by the client computing system 200 may be stored in a database 214. The list or other identification of unsigned applications 212 can be compared to the authorized applications stored in the database 214 or elsewhere, such as by the compare module 216. If the list/identification of unsigned applications 212 corresponds to those stored in the database 214 for that client computing system 200, the developer license may be renewed as depicted by the developer license 218. An application licensing module 220 resident at or otherwise accessible to the client computing system 200 would therefore be allowed to continue working with the authorized list/identification of unsigned applications 212.

On the other hand, if there are additional unsigned applications 212 at the client computing system 200 over what the client computing system 200 should have based on records in the database 214 or elsewhere, the developer license 218 may not be reissued. In such a case, the user's developer license privileges are in essence revoked, as a new license 218 is not provided for use by the application licensing module 220.

As noted above, having the client computing system 200 the identification of the unsigned applications 212 may not be foolproof. Some users may attempt to trick the application computing system 202, such as the developer license module 208, into renewing the developer license 218 even though the client computing system 200 is using one or more unauthorized unsigned applications 212. Consequently, one embodiment involves providing verification/security information 222. This information may include any one or more of identification information, time-related information, encryption keys and/or techniques, or other information and techniques to protect the veracity of the identification of unsigned applications 212.

For example, the verification/security information 222 provides measures to at least make tampering with the current identification of unsigned applications 212 more difficult, and to make detection of such efforts possible. The verification/security information 222 may involve multiple verification and/or security information items shown as information items 222A-222C. The verification/security information items 222A-222C may be obtained from memory or storage, circuit or module outputs or the like, and may be provided with and/or used in connection with the developer license renewal request 210. In one embodiment, identifiers correlating the client computing system 200 may be provided, such as a hardware ID 210A and machine ID 210B, timestamp 210C, encryption techniques 210D, and/or other information in addition to the identification of unsigned applications 212B. These representative verification/security features are described in greater detail below.

When one or more such additional verification/security information items 222A-222C are provided, the developer license module 208 can be more assured that the unsigned applications 212 provided via the developer license renewal request 210 is a current and accurate representation of the unsigned applications at the client computing system 200.

Figure 3:
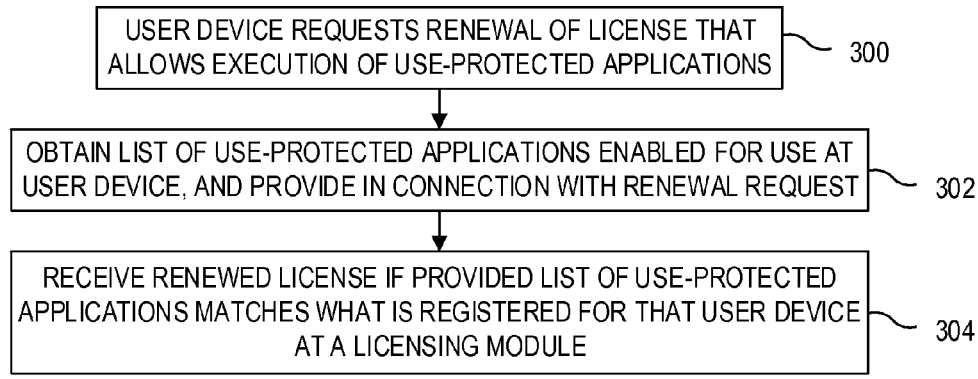
FIG. 3 is a flow diagram illustrating a representative embodiment for facilitating a license renewal at a user device.

FIG. 3 is a flow diagram illustrating one embodiment for facilitating a license renewal at a user device. At block 300, the user device may request renewal of a license type that allows execution of otherwise use-protected applications. For example, the license type may be a developer license that allows the user to run applications that are otherwise protected for use unless permitted to do so. An example is an application that a user is developing, and by obtaining a developer license the developer can run the application without digital signatures in order to test, debug or otherwise use the application being developed.

In one embodiment, the user device requests renewal of the license at block 300 in view of expiration or impending expiration of a current license, although a renewal request may be initiated for other reasons whether time-based, event-based, random, etc. Alternatively, the licensing module or other entity may initiate the license renewal, with or without the knowledge of the user device (although with consent of the user in one embodiment). For example, a licensing module can set a license expiration time, and when the time has expired or is nearing expiration, the licensing module can communicate with the user device to retrieve the list or other identification of use-protected applications. In one embodiment, the licensing module may request that the user device provide a list of use-protected applications, where such a list can be returned automatically to the licensing module for analysis, or returned manually by a user of the user device.

In connection with the renewal request, a list or other identification of use-protected applications that have been enabled for use at the user device is obtained, as shown at block 302. Such a list may be obtained, for example, from memory or storage that is within or otherwise accessible to the user device where an identification of the use-protected applications enabled is maintained. As noted above, one embodiment of such use-protected application is a signed application, such as having been digitally signed. A digital signature can be used to enable a recipient to recognize the source of received digital information, but can be used in accordance with the disclosure. An application can be configured for use by not digitally signing it, removing a digital signature, or otherwise. It should be noted that providing the "list" of the otherwise use-protected applications does not connote any particular data structure. In other words, the "list" of use-protected applications refers to an identification of those applications, and not that the use-protected applications are identified by way of a "list" data structure (although it could be).

The identification of the use-protected applications is provided in connection with the renewal request, as also shown at block 302. Providing such an identification of the applications may be provided by way of a transmitter configured to provide the information via wired and/or wireless networks, whether infrastructure-based, peer-to-peer, ad hoc network, etc. In one embodiment, "providing" the information involves directing the identification of use-protected applications to an address of a licensing module.

As shown at block 304, the user device will receive a renewed license if the provided list of use-protected applications matches what has been registered at a licensing module for use for that user device. For example, if the licensing module is aware of three unsigned applications being developed by a user of the user device, and an identification of those same three unsigned applications was provided at block 302, a renewed license may be issued by the licensing module and received by the user device. This would enable the user device to continue testing, debugging, or otherwise executing the unsigned applications associated with the list of unsigned applications. On the other hand, if more unsigned applications are noted in the list of applications provided to the licensing module, the list will not match what has been registered for that user device, and the license will not be renewed in one embodiment.

Figure 4:
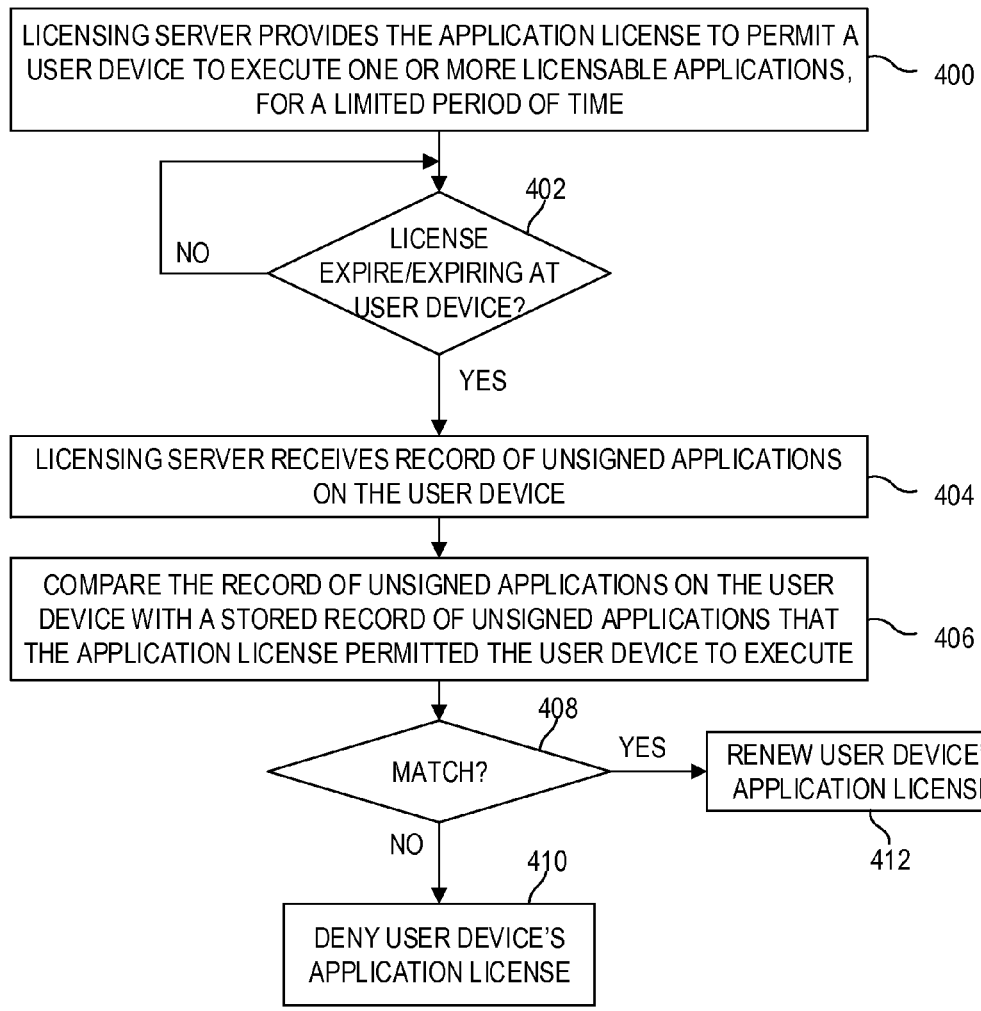
FIG. 4 is a flow diagram illustrating a representative embodiment in which a licensing server facilitates license renewal of applications at a user device.

FIG. 4 is a flow diagram illustrating an embodiment in which a licensing server facilitates license renewal of applications at a user device. At block 400, the licensing server provides the application license in order to permit the user device to execute one or more licensable applications for a limited period of time. The limited period of time may be on the order of minutes, hours, days, etc., and in one embodiment is approximately 15 days. During this time, the user can execute any unsigned applications on the user device whether authorized or not. In one embodiment, when the license expires or expiration is nearing as determined at block 402, the licensing server may receive a record of the unsigned applications on the user device. As noted above, in this embodiment, an unsigned application generally represents an application that has not been digitally signed, although the principles described herein are equally applicable to other application statuses.

The licensing server compares, as depicted at block 406, the record of unsigned applications on the user device with a stored record of unsigned applications that the application license has permitted the user device to run. If there is a match as determined at block 408, meaning that the record of unsigned applications on the user device corresponds with the stored record of unsigned applications permitted by the application license, the user device's application license will be renewed as shown at block 412. Otherwise, as shown at block 410, the user device's application license will be denied.

Figure 5:
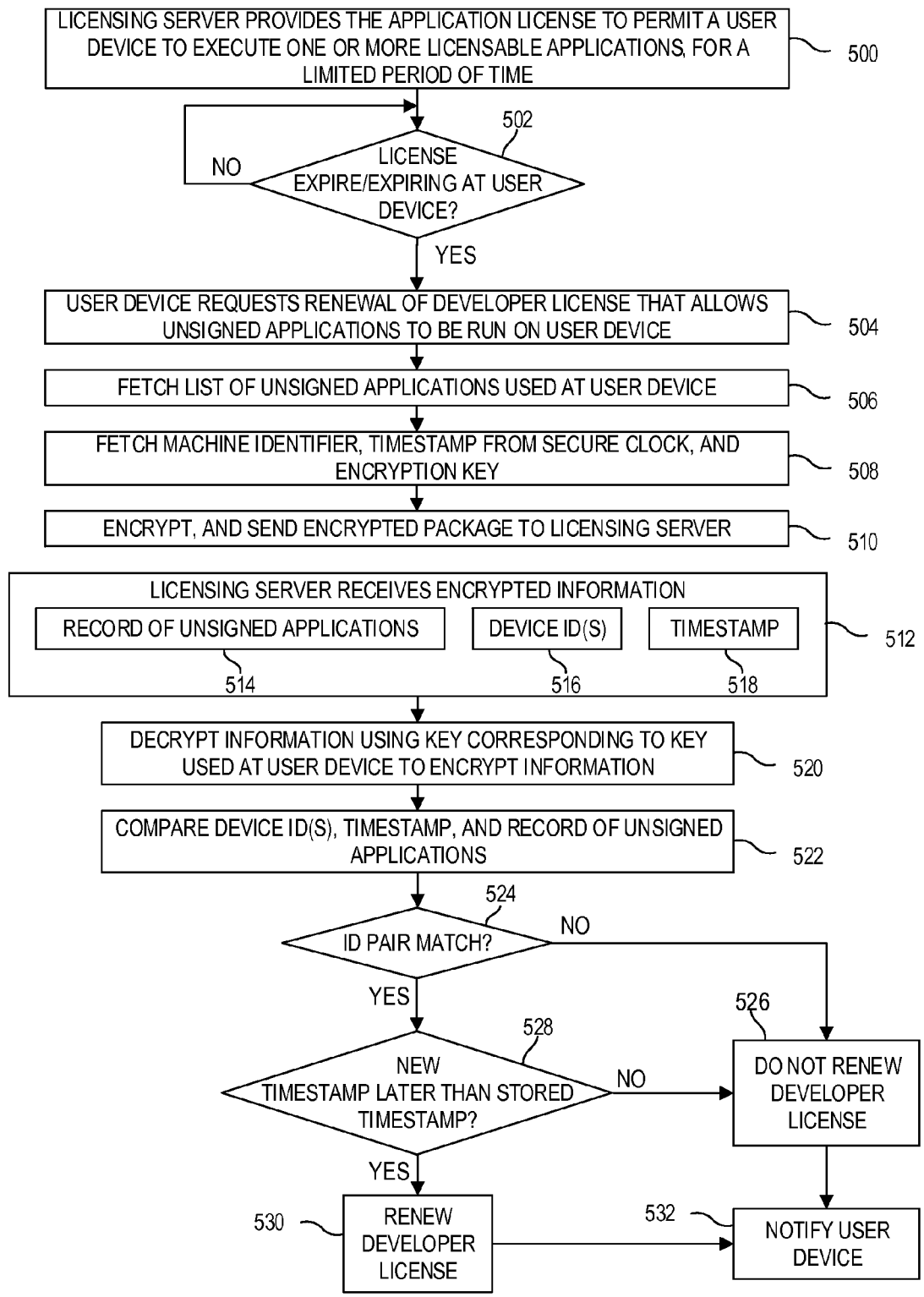
FIG. 5 is a flow diagram depicting a representative example of a method involving both a user device and a licensing server to facilitate the licensing of applications in development mode.

FIG. 5 is a flow diagram depicting a representative example of a method involving both a user device and a licensing server to facilitate the licensing of applications in development mode. For purposes of this example, development mode entails a mode in which a developer using the user device is testing, debugging, or otherwise running applications in development on the user device.

At block 500, the licensing server provides the application license in order to permit the user device to execute one or more licensable applications for a limited period of time. In one embodiment, it is determined when the license expires or is nearing expiration at block 502. At block 504, the user device requests renewal of the developer license that allows unsigned applications to be run on the user device. A list of unsigned applications that are used at the user device's obtained at block 506, as is at least a machine identifier, timestamp from a secure clock, and an encryption key as shown at block 508. In one embodiment, the encryption key is used to encrypt at least the machine identifier corresponding to the user device, and the timestamp from the secure clock, and the resulting encrypted package is sent to the licensing server as shown at block 510. It should be noted, however, that some embodiments use no encryption at all.

The licensing server receives the encrypted information at block 512. In one embodiment the encrypted information includes the record of unsigned applications 514, at least one device ID 516 and a timestamp 518 from the user device. In one embodiment, two device IDs 516 are provided, including a hardware ID and a machine ID. For example, a hardware ID may be derived from the system components of the actual user device. Generation of a hardware ID may therefore provide a device-dependent identifier based on the particular components of the device, such as the processor(s) being used, the motherboard being used (e.g. motherboard serial number), and/or other hardware specifics. The hardware ID in essence takes fingerprints that are related to each of the components, and creates a system fingerprint that identifies the particular user device.

However, because components in a user device may be replaced, added or otherwise changed, such a hardware ID can potentially change over time. A change tolerance limit may be used for the hardware ID, such that it can only change by a certain amount over some period of time. Therefore, the hardware ID may be unique within a certain tolerance, but may not be completely unique. In one embodiment, a user device identifier having a higher degree of uniqueness is provided in addition to a hardware ID. One embodiment therefore also uses what is referred to herein as a machine ID which may identify each user device.

For example, the user device or client can generate the hardware ID based on the configuration based on a machine. In one embodiment, the hardware ID is created by a process provided with the operating system used by the user device. When the user device connects to a server, such as when the user device first connects to a licensing server to obtain an application license, the server may be configured to generate a machine ID that will identify the user device. In one embodiment, the server sends back most of the hardware ID, as well as the generated machine ID, as a hardware ID/machine ID combination or binding, in response to a first communication with a licensing authority. When the machine ID is sent back to the user device, the machine ID and the hardware ID may be sent via a data structure that the user of the user device cannot tamper with, such as a secure blob. In one embodiment, the hardware ID/machine ID binding is stored at a secure location at the user device, and therefore both the user device and the licensing server will store the binding.

On a subsequent communication from the user device to the licensing server, that entire secure blob including the hardware ID/machine ID binding can be received at the licensing server to identify the user device, and verify that matches the hardware ID. It should be noted that both the hardware ID and machine ID may be encrypted when communicated from the user device to the licensing server, but in one embodiment only the machine ID is subject to the encryption while the hardware ID is sent in clear. For example, the encryption of block 510 encrypts the machine ID but not the hardware ID in one embodiment. Verification of matching hardware ID/machine ID combinations addresses the problem of a user attempting to send the list of unsigned applications from a different user device, which is described in greater detail below.

The encrypted information received at the licensing server as shown at block 512 also includes a timestamp 518. The timestamp could be derived from any clocking mechanism available at the user device. In one embodiment, a licensing module at the user device maintains a tamper resistant and anti-rollback secure clock that progresses independent of the system clock, which is used to generate the timestamp 518. The timestamp 518 essentially records a time that correlates to the time at which the user of the user device is requesting or otherwise seeking a renewed developer license or other application license. The particular time in which the timestamp 518 is generated is not particularly important, as the timestamp 518 will be used to determine a proper chronology relative to the last timestamp sent to the licensing server. Nevertheless, in one embodiment, the timestamp is generated when the user uploads the list of unsigned applications to the licensing server. On a subsequent transfer of the list of unsigned applications to the licensing server, the secure clock should have advanced, such that the next timestamp is later in time than the prior timestamp. This information can be used at the licensing server to determine whether the user attempted to resend an older version of the blob or other package used to transmit the list of unsigned applications to the licensing server.

In those embodiments in which at least some of the information such as the record of unsigned applications 514, device ID(s) 516, and/or timestamp 518 is encrypted, the information is decrypted as shown at block 520. In one embodiment, the information is decrypted using a key corresponding to the key used at the user device to encrypt the information. In one embodiment, the key is made available to the user device by way of being stored in the operating system of the user device. The key may be made available to the licensing server by way of the operating system as well, or by being stored at a known location in storage or memory.

Once decrypted, the device IDs, timestamp, and record of unsigned applications received from the user device and also stored at the licensing server are compared as shown at block 522. While the particular sequence in which the comparison is made is not relevant, FIG. 5 depicts a determination shown at block 524 whether the device IDs match. For example, an ID pair, such as the hardware ID/machine ID binding, may be compared. If the binding stored at, or otherwise available to the licensing server does not match the binding received from the user device, the developer license will not be renewed in one embodiment as depicted at block 526. If the bindings do match, it may also be determined at block 528 whether the received timestamp indicates a chronological point in time later than the last timestamp that was stored for that user device at the licensing server. If not, the developer license is not renewed as shown at block 526. If the ID pair matches as determined at block 524, and the most recently received timestamp is later in time than the last timestamp stored by the licensing server, the developer license may be renewed as depicted at block 530.

Figure 6:
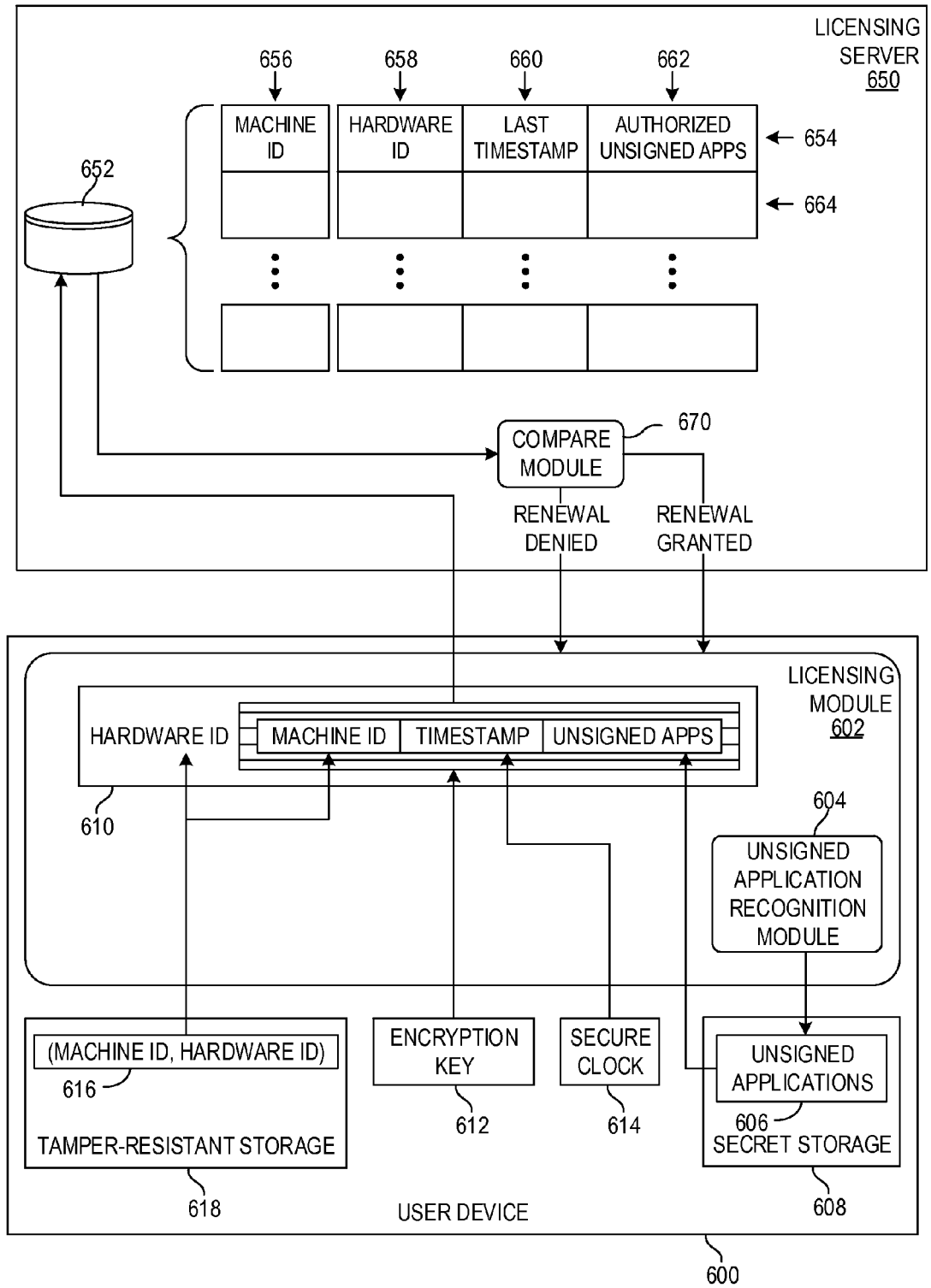
FIG. 6 is a block diagram depicting an embodiment involving both a user device and a licensing server to facilitate the licensing of applications in development mode.

FIG. 6 is a block diagram depicting an embodiment substantially corresponding to the flow diagram of FIG. 5. In FIG. 6, the user device 600 represents any type of computing device that can run applications and communicate information. For example, the user device 600 may represent a desktop computer, laptop computer, smart phone or other handheld device, etc. In the illustrated embodiment, a licensing module 602 may be used to carry out features described herein at the user device 600. In one embodiment, the licensing module 602 represents software executable by a processor and/or other computing complements of the user device 600. Software associated with the licensing module 602 may be provided in an operating system or other supervisory system, or in any other application or program executing on the operating system.

In one embodiment, an unsigned application recognition module 604 is provided to assist with maintaining the list of unsigned applications 606 at the user device 600. The unsigned application recognition module 604 may also be implemented in software executable via a processor, and may execute automatically without interaction or even knowledge by the user of the user device 600. When a developer or other user installs or otherwise deploys an unsigned application on the user device 600, the unsigned application recognition module 604 can make note of that internally. For example, the unsigned application recognition module 604 can record the name of the unsigned application that was installed or deployed, and also record any other attributes about that application that may be desired. In one embodiment, the list of unsigned applications 606 is stored in a secret storage location 608, such as a storage location that is unknown to the user, inaccessible to the user, secured from access to the user, etc. In this manner, it is difficult or impossible for a user to tamper with the list of unsigned applications 606. When a renewed license is requested, the maintained list of unsigned applications 606 is provided with the blob or other package 610 to the licensing server 650 for analysis to determine if a renewed license will be granted.

In the embodiment of FIG. 6, the secure clock 614 provides the timestamp previously discussed. The machine ID/hardware ID pairing 616 is stored in tamper-resistant storage 618 in one embodiment. The hardware ID, machine ID, timestamp, and list of unsigned apps can be provided in a data blob or other data package 610 to the licensing server 650. In one embodiment, information relating to multiple user devices at the licensing server 650 is stored in a local or remote database 652. An example of the type of information stored in the database 652 is depicted at row 654, which for any given user device includes a machine ID 656, hardware ID 658, last timestamp 660 provided by the user device, and the unsigned applications 662 that are known to the authorized for use at the user device 600.

Assume for purposes of explanation that the database record 664 includes the data for the particular user device 600. Based on, for example, the machine ID 656, the database records 664 from the database 652 may be located for the user device 600. Using the information from the records 664 and the information sent in the data blob or other data package 610, a comparison can be made as depicted by compare module 670. If the hardware ID/machine ID pairing, timestamp, and list of unsigned applications all match, the license renewal may be granted. If the hardware ID/machine ID pairing does not match, it may indicate that the user is attempting to provide a list of applications from a different user device, and license renewal may be denied. If the timestamp provided via the data blob or other data package 610 is not later in time than the last timestamp 660 stored at record 664, it may indicate that the user is attempting to replay a prior list of unsigned applications to avoid sending a current list that includes one or more unauthorized unsigned applications. In such case, license renewal may be denied. Further, even where the hardware ID/machine ID pairing and timestamp match, the list of unsigned applications may still not match, such as where the user is not sufficiently technically sophisticated to attempt the workarounds that the device IDs and timestamp can catch. If the list of unsigned applications do not match, as determined by the compare module 670, license renewal may be denied.

Figure 7:
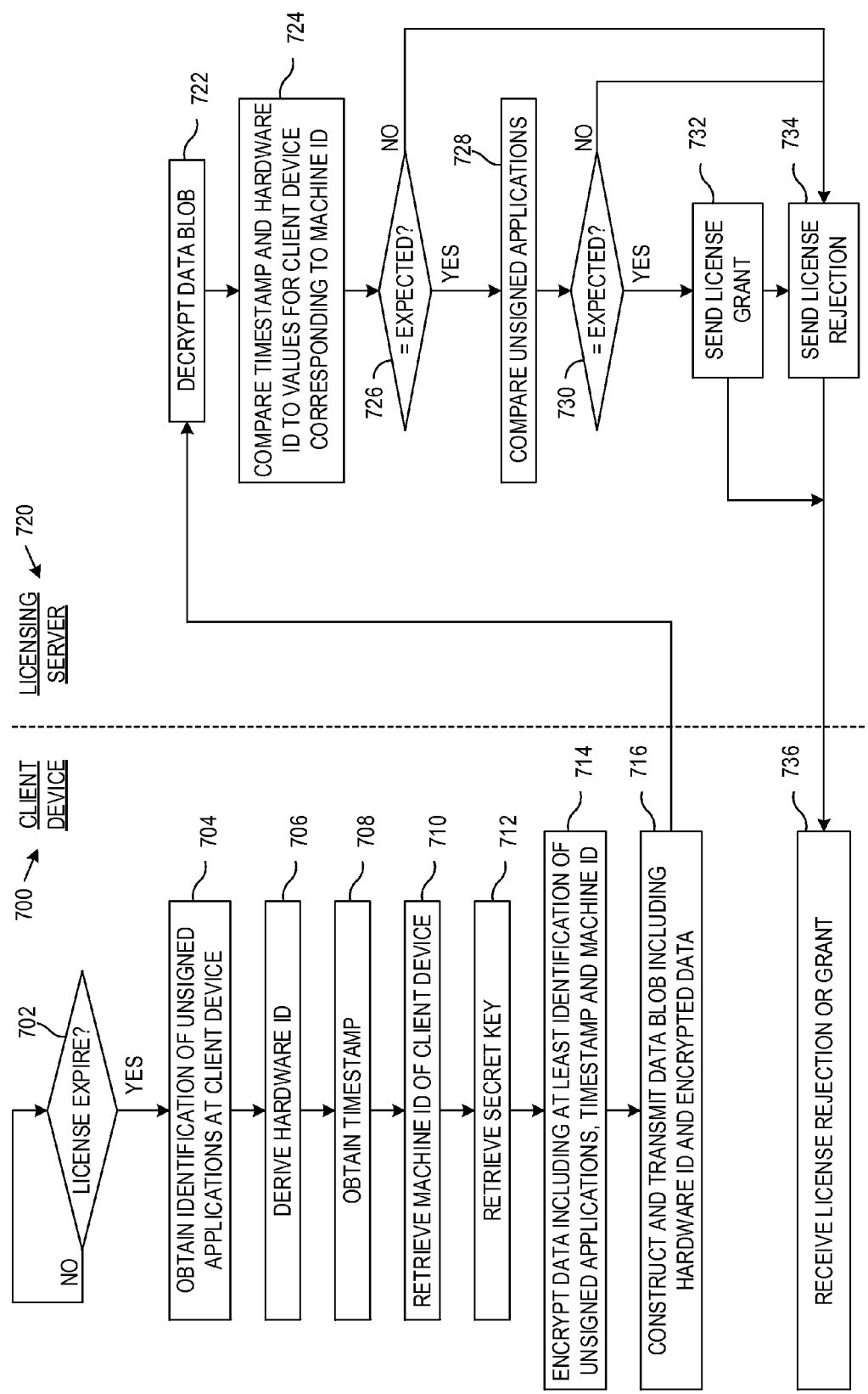
FIG. 7 is a flow diagram depicting a more particular example in which a client device can seek license renewal from a licensing server.

FIG. 7 is a flow diagram depicting a more particular example in which a client device 700 can seek license renewal from a licensing server 720. At block 702 is determined when the license at the client device 700 will expire. Upon expiration, identification of the unsigned applications that the client device is obtained as depicted at block 704. In the illustrated embodiment, the hardware ID is derived at block 706 based on the particular components of the client device 700. The timestamp may be obtained as shown at block 708, such as being obtained from a secure clock. At block 710, the machine ID that was originally provided by the licensing server 720 is retrieved at the client device 700. A secret key is retrieved at block 712 which may be used at block 714 to encrypt data including at least the identification of the unsigned applications, the timestamp, and the machine ID.

Figure 8:
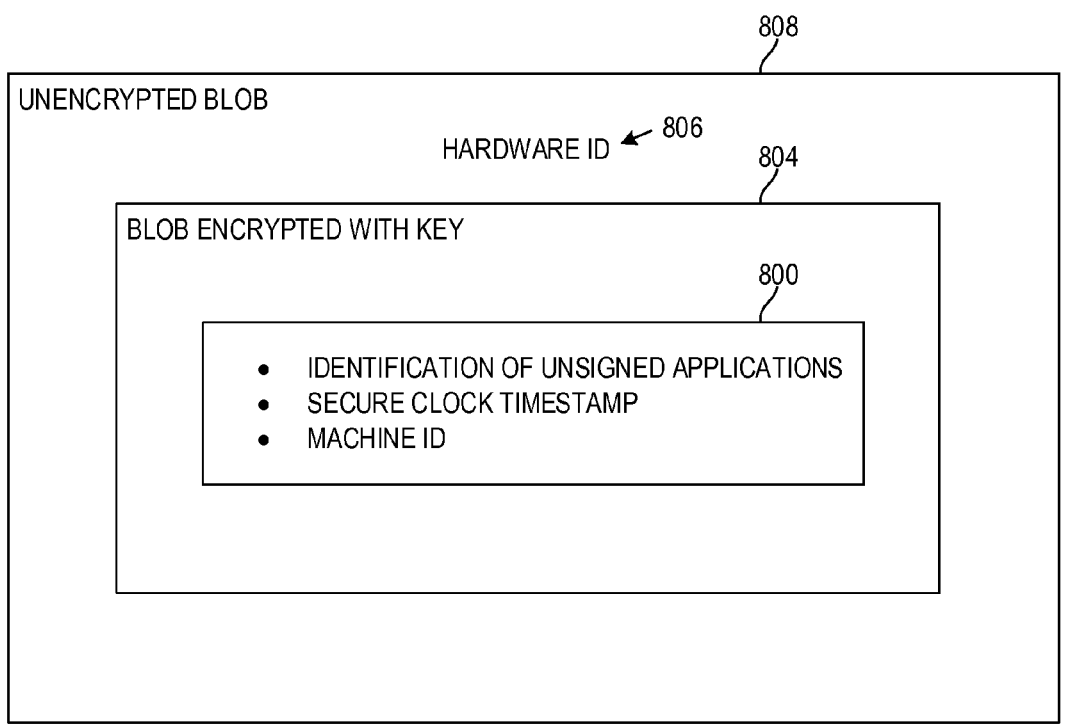
FIG. 8 is an example of a data blob that may be used to provide the identification of user device applications and other verification information to a licensing server.

While the information may be provided to the licensing server 720 from the client device 700 in any desired manner, one embodiment involves providing the information in a secure data transfer such as a secure binary large object (blob), which as used herein can represent any type of data transfer whether structured, streaming, etc. Referring briefly to FIG. 8, an example of a data blob is depicted that, in one embodiment, is used to provide the identification of user device applications and other verification information to a licensing server. Verification information 800 may be encrypted with a key that is known to both the client device and the licensing server, resulting in an encrypted blob 802. In the illustrated embodiment, the encrypted information includes the identification of the unsigned applications at the client device, the timestamp, and the machine ID. The secure or encrypted blob 804 may be provided to the licensing server, or as in the example of FIG. 8, additional information that is not subject to the encryption may be provided. For example, the hardware ID 806 is not encrypted in this example, but rather is included with an unencrypted blob 808 together with the encrypted blob 804. In this manner, the hardware ID 806 can be changed to adapt to change in the client device components without the overhead of encrypting it, while the list of unsigned applications, timestamp and machine ID is encrypted to reduce the chances of tampering. The blob 808 may then be provided to the licensing server. It should be recognized that the identification of unsigned applications, and supporting verification information if used, may be provided to the licensing server in other manners than using blobs.

Returning to the example of FIG. 7, the data blob or other transfer package that includes the hardware ID and the encrypted data is constructed and transmitted, as depicted at block 716. The licensing server 720 decrypts the data blob as shown at block 722. At block 724 of the illustrated embodiment, the timestamp and hardware ID are compared to reference timestamp and hardware ID values for the client device having that machine ID. If the values are not as expected, renewal of the license may be rejected, and a notification of license rejection as shown at block 734 may be returned to the client device 700.

If the values are as expected, the identification of the unsigned applications from the client device 700 is compared at block 728 to an identification of unsigned applications believed by the licensing server 720 to be authorized for use on the client device 700. If the comparison of unsigned applications is not as expected, renewal of the license may be rejected, and a notification of license rejection as shown at block 734 may be returned to the client device 700. If the comparison of block 728 is as expected, renewal of the license may be granted, and a notification of the license grant as shown at block 732 may be returned to the client device 700. With a renewed license, the client device 700 may continue to run, test, debug, or otherwise use the unsigned applications that were identified to the licensing server 720.

It should be recognized that the sequence of various functions in FIG. 7 or other flow diagrams need not be in the representative order that is depicted unless otherwise noted. For example, obtaining the identification of unsigned applications at block 704, deriving the hardware ID at block 706, obtaining the timestamp at block 708, retrieving the machine ID at block 710 and retrieving the secret key at block 712 can be performed in any order. Similarly, licensing server comparisons (e.g., at block 724, 728) may be performed in any desired sequence, and the depiction in FIG. 7 is merely for purposes of illustration.

Figure 9:
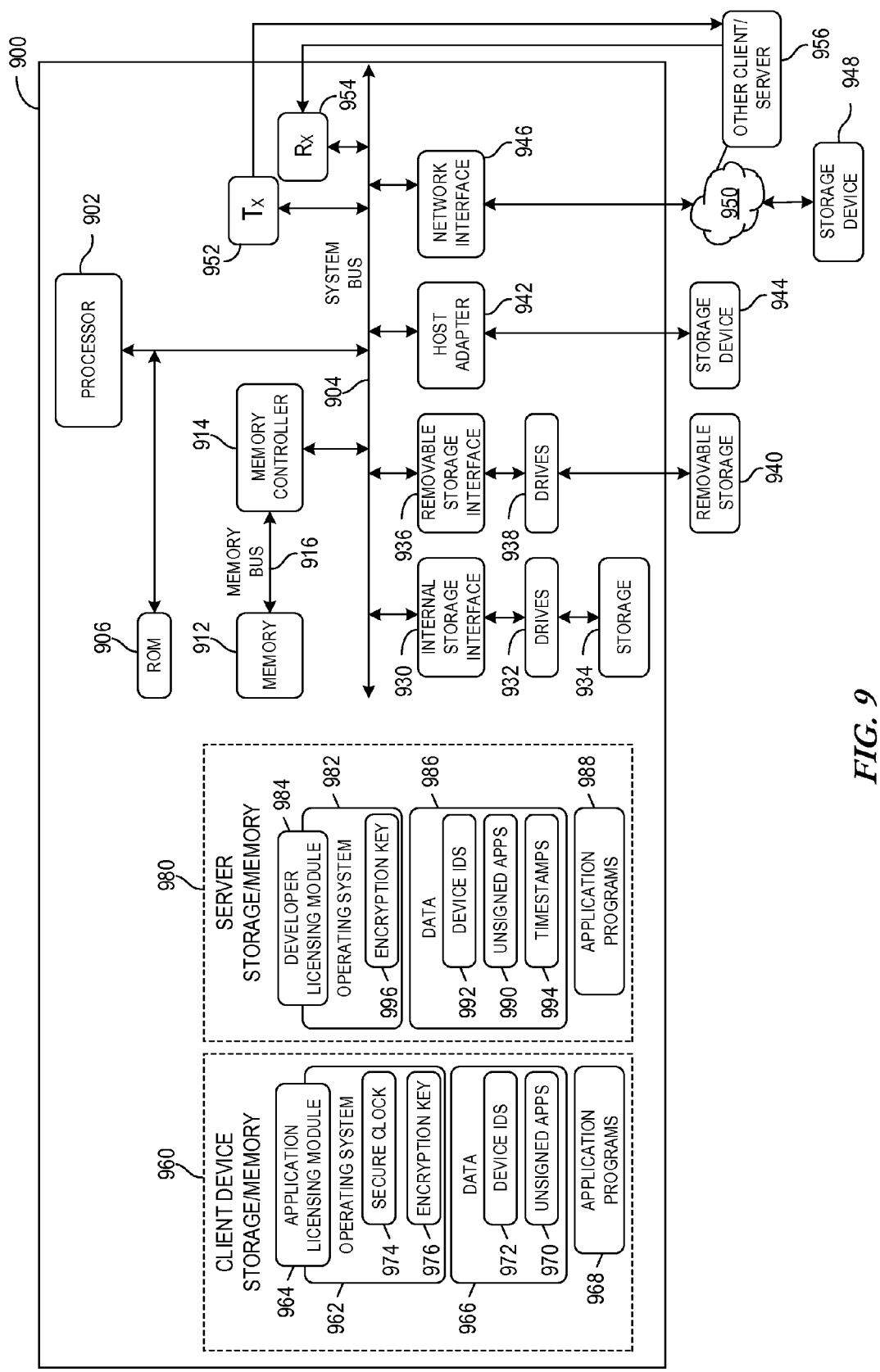
FIG. 9 depicts a representative computing system in which the principles described herein may be implemented.

FIG. 9 depicts a representative computing system 900 in which the principles described herein may be implemented. The representative computing system 900 can represent either a user/client device or a licensing server, with differences noted below. The computing environment described in connection with FIG. 9 is described for purposes of example, as the structural and operational disclosure for facilitating application licensing verification and renewal is applicable in any environment in which applications can be executed and/or licensing authorizations may be provided. It should also be noted that the computing arrangement of FIG. 9 may, in some embodiments, be distributed across multiple devices.

For both client devices and licensing servers, the representative computing system 900 may include a processor 902 coupled to numerous modules via a system bus 904. The depicted system bus 904 represents any type of bus structure(s) that may be directly or indirectly coupled to the various components and modules of the computing environment. A read only memory (ROM) 906 may be provided to store firmware used by the processor 902. The ROM 906 represents any type of read-only memory, such as programmable ROM (PROM), erasable PROM (EPROM), or the like.

The host or system bus 904 may be coupled to a memory controller 914, which in turn is coupled to the memory 912 via a memory bus 916. The application licensing and verification aspects described herein may be stored in and/or utilize any storage, including volatile storage such as memory 912, as well as non-volatile storage devices. FIG. 9 illustrates various other representative storage devices in which applications, modules, data and other information may be temporarily or permanently stored. For example, the system bus may be coupled to an internal storage interface 930, which can be coupled to a drive(s) 932 such as a hard drive. Storage 934 is associated with or otherwise operable with the drives. Examples of such storage include hard disks and other magnetic or optical media, flash memory and other solid-state devices, etc. The internal storage interface 930 may utilize any type of volatile or non-volatile storage.

Similarly, an interface 936 for removable media may also be coupled to the bus 904. Drives 938 may be coupled to the removable storage interface 936 to accept and act on removable storage 940 such as, for example, floppy disks, optical disks, memory cards, flash memory, external hard disks, etc. In some cases, a host adaptor 942 may be provided to access external storage 944. For example, the host adaptor 942 may interface with external storage devices via small computer system interface (SCSI), Fibre Channel, serial advanced technology attachment (SATA) or eSATA, and/or other analogous interfaces capable of connecting to external storage 944. By way of a network interface 946, still other remote storage may be accessible to the computing system 900. For example, wired and wireless transceivers associated with the network interface 946 enable communications with storage devices 948 through one or more networks 950. Storage devices 948 may represent discrete storage devices, or storage associated with another computing system, server, etc. Communications with remote storage devices and systems may be accomplished via wired local area networks (LANs), wireless LANs, and/or larger networks including global area networks (GANs) such as the Internet.

As described herein, the client and server devices communicate information, such as application licenses, requests for renewed licenses, identification of unsigned or other use-protected applications, verification information, status of license renewal, etc. Communications between the client and server devices can be effected by direct wiring, peer-to-peer networks, local infrastructure-based networks (e.g., wired and/or wireless local area networks), off-site networks such as metropolitan area networks and other wide area networks, global area networks, etc. A transmitter 952 and receiver 954 are shown in FIG. 9 to depict the representative computing system's structural ability to transmit and/or receive data in any of these or other communication methodologies. The transmitter 952 and/or receiver 954 devices may be stand-alone components, may be integrated as a transceiver(s), may be integrated into or already-existing part of other communication devices such as the network interface 946, etc.

Where the computing system 900 represents a client device where application development may occur, a list of unsigned applications, hardware ID/machine ID pair, timestamp, and/or other information may be transmitted via the transmitter 952. Analogously, where the representative computing system 900 represents a licensing server or other computing device configured to facilitate license verification, information from the client device may be received via the receiver 954, whether it is a stand-alone device, integrated with a transmitter 952, integral to the network interface 946, etc. Communication between the client and server may utilize both of their transmitters 952 and receivers 954. As computing system 900 can represent a client or licensing server, block 956 represents the client or server that is communicating with the computing system 900 that represents the other of the client or server.

Where the representative computing system 900 represents a client device, the memory 912 and/or storage 934, 940, 944, 948 may be used to store programs and data used in connection with the user device's license verification and renewal techniques previously described. The client device storage/memory 960 represents what may be stored in memory 912, storage 934, 940, 944, 948, and/or other data retention devices. The representative client device storage/memory 960 may include an operating system 962, and at least an application licensing module 964 executable by the processor 902. In one embodiment, software used to carry out functions described herein is implemented in the application licensing module 964. The client device storage/memory 960 may also include data 966, and other programs such as the application programs 968 that are being developed or otherwise used by the user of the client device.

The data 966 in the client device storage/memory 960 may include the identification of the unsigned or otherwise use-protected applications 970. The "identification" of the unsigned applications 970 may involve any manner of identifying the unsigned applications 970, such as filenames, metadata associated with the unsigned applications, hash values, etc. Thus, what is stored as an identification of the unsigned applications 970 may be any data that can identify its respective application. Other information that can be stored as data 966 includes one or more device IDs 992, such as the hardware ID and a machine ID previously described.

Some information may be provided to the client device storage/memory 960 as part of an operating system or other application. For example, in one embodiment, an encryption key(s) 976 used to encrypt data may be provided with the operating system 962. Such an encryption keys 976 may be stored into memory 912 if and when needed to assist with encryption functions. A secure clock 974 may be implemented in software, possibly assisted by hardware, such that it may be provided with the operating system 962. For example, software to securely retrieve time information may be provided by way of the operating system 962, whereby a timestamp or other verification information may be obtained therefrom for use in the request for a license renewal.

Where the representative computing system 900 represents a licensing server, the memory 912 and/or storage 934, 940, 944, 948 may be used to store programs and data used in connection with the server's license verification and renewal techniques previously described. The server storage/memory 980 represents what may be stored in memory 912, storage 934, 940, 944, 948, databases, and/or other data retention devices. The representative server storage/memory 980 may include an operating system 982, and at least a developer licensing module 984 executable by the processor 902. In one embodiment, software used to carry out functions described herein is implemented in the developer licensing module 984. The server storage/memory 980 may also include data 986, as well as other programs such as application programs 988 available for sale and/or licensing to users.

The data 986 in the server storage/memory 980 may store the list or other identification of the unsigned or other use-protected applications 990 that are believed to be authorized for use on the client device. The data 986 may also include device IDs 992, such as hardware ID/machine ID bindings for the client device and potentially many other client devices. The last timestamp 994 received from a client device may also be stored as data 986. The server storage/memory 980 can also at least temporarily store the list/identification of the unsigned or use-protected applications, device IDs, and timestamps that have been received from the client device in connection with a license renewal request. In one embodiment, the most recently received timestamp from a client device will be stored as the most recently received or "last" timestamp 994 that was received from the client device.

Some information may be provided to the server storage/memory 980 as part of an operating system or other application. For example, in one embodiment, an encryption key(s) 996 used to at least decrypt encrypted messages from the client device may be provided with the operating system, and stored into memory 912 if and when needed to assist with decryption functions.

As previously noted, the representative computing system 900 in FIG. 9 is provided for purposes of example, as any computing device having processing and communication capabilities can carry out the functions described herein using the teachings described herein.

As demonstrated in the foregoing examples, embodiments described herein provide information indicative of whether a user may be using one or more applications in an unauthorized fashion, and in some embodiments securely sending identification of the applications used on the device in relation to a digital license renewal. In various embodiments, methods are described that can be executed on a computing device, such as by providing software modules that are executable via a processor (which includes a physical processor and/or logical processor, controller, etc.). The methods may also be stored on computer-readable media that can be accessed and read by the processor and/or circuitry that prepares the information for processing via the processor. For example, the computer-readable media may include any digital storage technology, including memory 912, storage 934, 940, 944, 948, any other volatile or non-volatile digital storage, etc. Having instructions stored on a computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method performed by a licensing authority, the method comprising:
   receiving, by the licensing authority, a license renewal request generated by a computing device, wherein the computing device is configured to distinguish between signed use-protected applications and unsigned use-protected applications such that (i) use-protected applications that are signed are permitted to be used based on being signed and such that (ii) use of use-protected applications that are not signed requires a license from the licensing authority, wherein the license renewal request was generated by the computing device:
      having determined that a license renewal was necessary and in response having identified one or more use-protected applications as unsigned,
      having formed a set of one or more identifiers of the respective identified unsigned use-protected applications, and
      having generated the license renewal request to include the set of one or more identifiers; and
   based on the set of one or more identifiers of the unsigned use-protected applications, granting a license renewal for the computing device that is provided to the computing device by the licensing authority, the license renewal controlling whether the computing device will prohibit or permit use of the one or more unsigned use-protected applications on the computing device.

2. A method according to claim 1, wherein the providing of the licensing renewal comprises the licensing authority transmitting the licensing renewal via a network to the computing device.

3. A method according to claim 1, wherein the licensing authority comprises a server device.

4. A method according to claim 1, wherein the license renewal request further comprises a security element, the method further comprising confirming the security element against corresponding licensing data to determine whether to grant the license renewal request.

5. A method according to claim 4, wherein the security element comprises a timestamp, the method further comprising determining whether to grant the renewal request based on an age of the timestamp.

6. A method according to claim 4, wherein the security element comprises a hardware identifier of computing device, and wherein the confirming comprises accessing a set of hardware identifiers and determining whether the hardware identifier matches a corresponding hardware identifier in the set of hardware identifiers.

7. A method according to claim 1, wherein the license renewal comprises a renewal of a developer license.

8. A method according to claim 1, wherein granting the license renewal based on the set of one or more identifiers comprises comparing the one or more identifiers against a set of application identifiers associated with the computing device.

9. A method according to claim 1, wherein the computing device is configured such that if the license renewal were not granted the computing device would not permit execution of the one or more unsigned use-protected applications based on lack of a license therefore.

10. A method performed by a computing device, the method comprising:
    managing use-protected applications by distinguishing between signed use-protected applications and unsigned use-protected applications, wherein use-protected applications that are signed are permitted to be used based on being signed, and wherein use of use-protected applications that are not signed requires a license from a licensing authority;
    responsive to a determination that the license has expired or is going to expire, identifying use-protected applications on the computing device that are not signed, and forming a plurality of identifiers of the respective use-protected applications identified as not being signed;

providing a license renewal request to a licensing authority, the license renewal request comprising the plurality of identifiers; and according to whether or not a renewed digital license is obtained responsive to the license renewal request, either prohibiting or permitting use of the identified use-protected applications on the computing device, wherein whether a renewed digital license is to be provided by the licensing authority depends on the identifiers of the unsigned use-protected applications received by the licensing authority.

11. A method according to claim 10, wherein the renewed digital license comprises a developer license that facilitates software development on the computing device.

12. A method according to claim 10, wherein the renewed digital license comprises a timestamp signed by the licensing authority, the method further comprising initiating a second license renewal request responsive to determining, according to the timestamp, that the renewed digital license has expired or will expire.

13. A method according to claim 10, further comprising encrypting the license renewal request before providing the license renewal request to the licensing authority.

14. A method according to claim 13, wherein the licensing authority comprises a server device and the providing comprises transmitting the encrypted license renewal request via the network to the server device.

15. One or more storage apparatuses coupled with a computing device comprising a processor, the one or more storage apparatuses storing information to configure the processor, when the computing device is in operation, to perform a process, the process, when the computing device is operating, comprising:

managing execution of use-protected applications on the computing device such that whether signed use-protected applications are permitted to be used or executed depends on verification of respective signatures thereof and whether unsigned use-protected applications are permitted to be used or executed depends on whether the computing device is storing a valid license that enables the unsigned use-protected applications to be used or executed;

responsive to a determination that a valid license for the unsigned use-protected applications is to be obtained, identifying one or more of the use-protected applications on the computing device that are not signed, and generating a license request comprised of one or more identifiers of the respective one or more use-protected applications identified as not being signed;

providing the license request to a licensing authority, the license request comprising the one or more identifiers; and receiving a valid license from the licensing authority in response to the license request, wherein the received valid license enables the unsigned use-protected applications to be used or executed, and wherein the licensing authority determined to provide the license based on the one or more identifiers of the unsigned use-protected applications received by the licensing authority in the license request.

16. One or more storage apparatuses according to claim 15, wherein signatures of use-protected applications on the computing device are computed by a software repository that manages distribution of applications to be installed on computing devices.

17. One or more storage apparatuses according to claim 15, wherein the determination by the licensing authority comprised comparing the one or more identifiers with one or more pre-stored application identifiers to determine that the one or more identifiers have been approved for unsigned execution.

18. One or more storage apparatuses according to claim 15, wherein the providing the license request comprises the computing device transmitting the license request via a data network to a server device hosting the licensing authority.

19. One or more storage apparatuses according to claim 15, wherein the license requests comprises a renewal request, and wherein the determination that a valid license is to be obtained comprises determining an expiration of a previous license.

20. One or more storage apparatuses according to claim 15, the process further comprising executing a licensing module on the computing device, the licensing module generating the license request and receiving and applying the valid license received from the licensing authority.

* * * * *